United States Patent
DeMott et al.

(10) Patent No.: US 6,764,744 B2
(45) Date of Patent: Jul. 20, 2004

(54) DIFFRACTIVE AND RETROREFLECTIVE TEXTILE FABRICS, METHODS OF MAKING SAME, AND ARTICLES MADE THEREFROM

(75) Inventors: Roy Phillip DeMott, Spartanburg, SC (US); Myra L. Cook, Spartanburg, SC (US); Alfred R. DeAngelis, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/416,969

(22) Filed: Oct. 12, 1999

(65) Prior Publication Data

US 2003/0129359 A1 Jul. 10, 2003

(51) Int. Cl.⁷ .............................................. G02B 5/124
(52) U.S. Cl. ...................... 428/141; 428/143; 428/144; 428/147; 359/515; 359/534; 359/536; 442/2; 442/221; 442/370; 442/417
(58) Field of Search ................................ 428/141, 143, 428/144, 147; 359/515, 534, 536; 442/417, 2, 221, 370

(56) References Cited

U.S. PATENT DOCUMENTS

| | | | |
|---|---|---|---|
| 4,187,332 A | 2/1980 | Fouche, Jr. ................... 427/47 |
| 4,211,261 A | 7/1980 | Mehta et al. ............... 139/425 |
| 4,871,597 A | * 10/1989 | Hobson ..................... 428/36.1 |
| 4,956,040 A | 9/1990 | Fry ............................ 156/267 |
| 5,073,222 A | 12/1991 | Fry ............................ 156/267 |
| 5,128,804 A | * 7/1992 | Lightle et al. .............. 359/515 |
| 5,224,439 A | 7/1993 | O'Connell et al. ......... 116/201 |
| 5,281,499 A | 1/1994 | Bussard .......................... 430/1 |
| 5,456,967 A | 10/1995 | Nezu .......................... 428/141 |
| 5,510,911 A | 4/1996 | Sharpe et al. .................. 359/1 |
| 5,593,765 A | 1/1997 | Sharpe et al. ............... 428/225 |
| 5,620,775 A | * 4/1997 | LaPerre ...................... 428/149 |
| 5,639,523 A | 6/1997 | Ellis .......................... 428/34.2 |
| 5,657,162 A | * 8/1997 | Nilsen et al. ............... 359/530 |
| 5,804,275 A | 9/1998 | Tsunefuji ..................... 428/105 |
| 5,866,236 A | 2/1999 | Faykish et al. ............. 428/195 |
| 5,876,532 A | 3/1999 | Billarant ...................... 156/66 |
| 5,882,770 A | 3/1999 | Makansi ..................... 428/156 |
| 5,928,803 A | * 7/1999 | Yasuda ........................ 374/101 |
| 5,945,201 A | 8/1999 | Holat .......................... 428/192 |
| 5,962,108 A | 10/1999 | Nestegard et al. .......... 428/172 |
| 5,962,121 A | 10/1999 | Mori .......................... 428/323 |
| 6,123,117 A | 9/2000 | Borellini ................. 139/420 A |
| 6,155,689 A | * 12/2000 | Smith ......................... 359/530 |

FOREIGN PATENT DOCUMENTS

| | | | | |
|---|---|---|---|---|
| JP | 6287863 A | 10/1994 | ......... | D06M/11/83 |
| JP | 6294034 A | 10/1994 | ............ | D02G/3/12 |

* cited by examiner

*Primary Examiner*—Harold Pyon
*Assistant Examiner*—Alicia Chevalier
(74) *Attorney, Agent, or Firm*—Terry T. Moyer; Sara M. Current

(57) ABSTRACT

A composite fabric structure having unique visual and physical properties is described. The composite fabric includes a textile fabric layer having a visual surface and a rear surface. A layer of diffractive or retroreflective material is secured beneath the textile fabric layer, either directly or beneath a layer of substantially transparent material. The textile fabric layer is of an open or semi-transparent construction, so that light can pass through it to reach the layer of diffractive or retroreflective material and be reflected back through the layer of textile fabric, to provide a unique appearance to its visual surface. Because fabric constructions can be provided which are extremely conspicuous, they have particular utility in the formation of safety equipment and automobile components. Furthermore, the fabrics have high durability, improved hand, and in many embodiments can be stretched as well as molded.

17 Claims, 2 Drawing Sheets

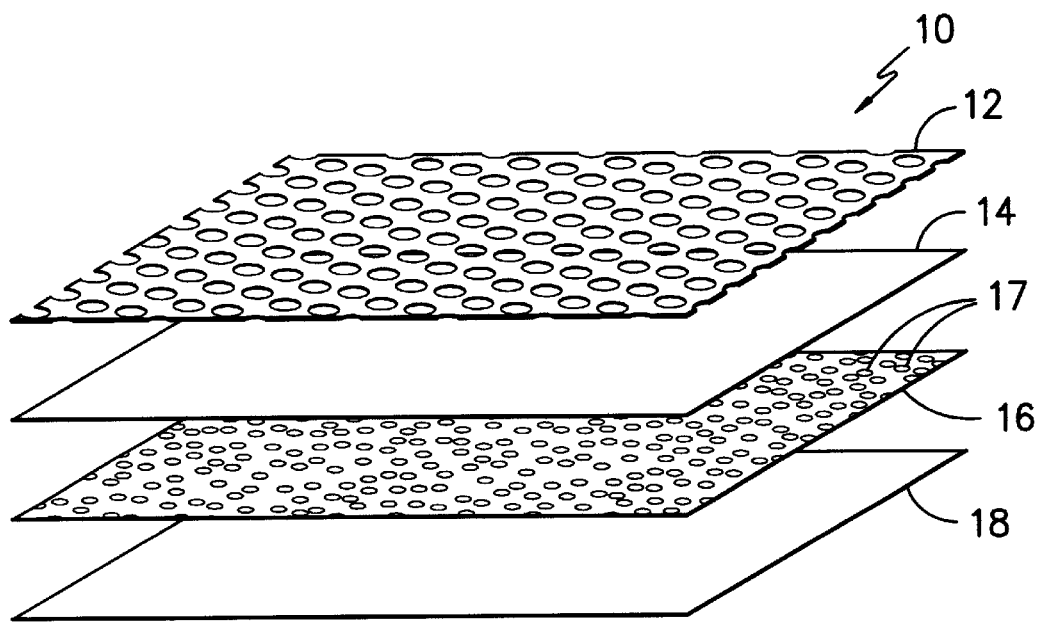
FIG. -1-
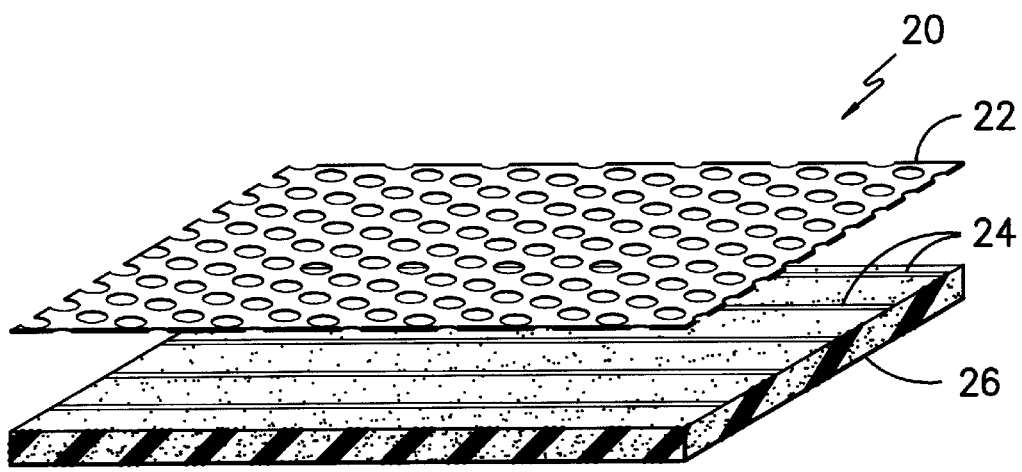
FIG. -2-

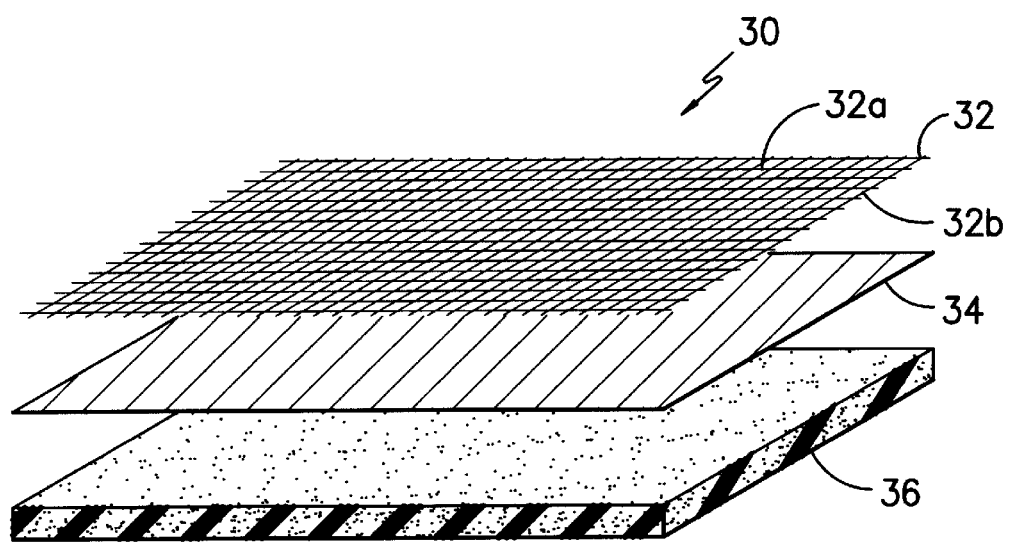
FIG. -3-
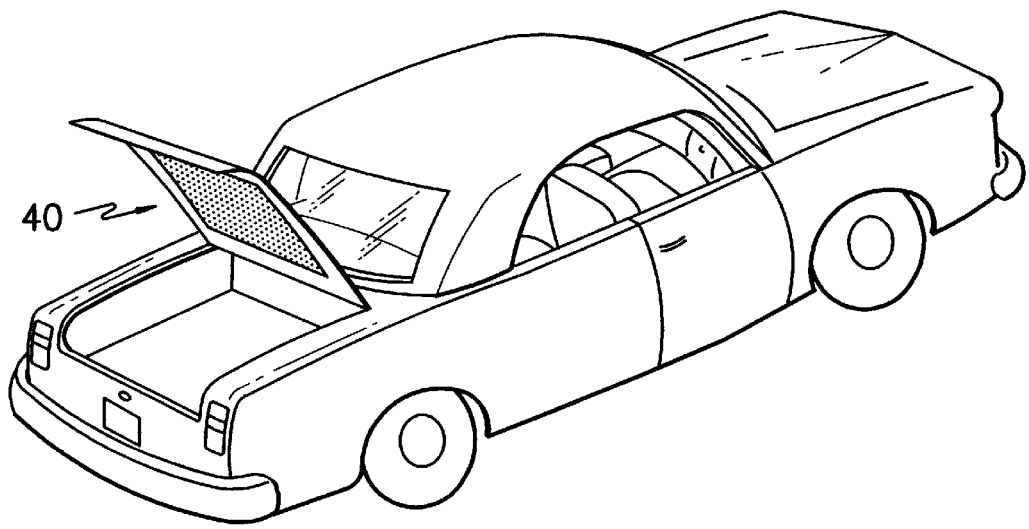
FIG. -4-

DIFFRACTIVE AND RETROREFLECTIVE TEXTILE FABRICS, METHODS OF MAKING SAME, AND ARTICLES MADE THEREFROM

BACKGROUND OF THE INVENTION

1. Field of the Invention

The invention generally relates to composite fabrics having unique aesthetic and physical features, and methods for their manufacture. More specifically, the invention relates to fabric constructions incorporating a layer of diffractive or retroreflective material behind a layer of textile material, to provide unique visual appearances in durable fabric constructions. Methods for making such fabric constructions and articles illustrating exemplary uses of the fabric constructions are also described.

2. Description of the Prior Art

Fabric manufacturers continually strive to develop new fabric constructions having unique visual characteristics, in order to satisfy consumer demand for variety in the appearance of the items they purchase. Furthermore, manufacturers are constantly attempting to provide fabrics with enhanced performance characteristics, as well as to minimize expenses associated with the use and conversion of the materials that they produce. With that in mind, many manufacturers have attempted to incorporate metallic elements, glitter, and other types of reflective materials into their fabrics in order to provide the materials with a shiny visual appearance, and reflective and/or retroreflective capabilities. In some cases, the incorporation of such elements is done for aesthetic reasons alone, while in others the elements are required to provide the fabrics with specific functional characteristics. For example, such materials are used in the production of items of reflective apparel for wear by nighttime joggers, in order that they will be more easily observed by the drivers of oncoming vehicles.

One method currently used for including colorful, shiny and/or reflective particulate to textile fabrics is to apply the particulate to the face of the fabric, generally by using a binder resin for adhesion. While fabrics made by this method are relatively simple to produce, they have several distinct disadvantages. For one, both the binder resin and the particulate adversely affect the hand of the fabric, rendering such fabrics unacceptable for some end uses. In addition, the particulate is susceptible to being abraded off, which reduces the effective life of the fabric and can be problematic, since the particulate matter is then undesirably transferred to other articles. Furthermore, the size of the particles which can be used to manufacture such fabrics is limited, as large particles are particularly prone to rubbing off and they adversely affect the hand to a greater degree then smaller particles. The applications for such materials can also be limited, particularly due to the difficulties with molding such materials. Not only does the binder have a tendency to melt during molding operations, but the particulate and binder tend to come off of the fabric during the molding process.

Another method for incorporating reflective materials into a fabric is to laminate a shiny material to the outer surface of a piece of fabric. For example, U.S. Pat. No. 5,593,765 to Sharpe describes a flexible laminate having an outer visible layer providing a holographic effect. The laminate includes a layer of metal foil bearing a holographic image, a layer of flexible fabric, and an adhesive layer between the fabric and the foil. The adhesive layer includes at least one plastics material, and the laminate is intended to behave essentially as the flexible fabric so that clothing can be manufactured from the fabric. However, because the holographic foil is unprotected in this construction, it can be easily damaged during use of the article which it is used to construct.

Another method for incorporating reflective elements into fabrics involves incorporating reflective yarns into the fabric structure itself. Some prior fabrics utilize reflective filaments which are woven or otherwise incorporated with other yarns to form a part of the fabric structure itself. For example, U.S. Pat. No. 5,224,439 to O'Connell describes a reflective arrow mount for securement to an automobile at a traffic or emergency scene. The fabric forming the arrow includes a plurality of light reflective filaments running along at least some of its edge portions, with the filaments being selected to present a highly illuminated configuration of the arrow when lit up by the headlights of an oncoming motor vehicle at night. It is noted, however, that the reflective filaments do not produce any measurable effect during daylight.

Similarly, U.S. Pat. No. 5,804,275 to Tsunefuji describes products made from flat threads in which triangular, pyramid-like or otherwise shaped micro-prisms are formed. The prisms are shaped such that incident light from a light source is reflected three times at the surfaces of each of the micro-prisms to direct the reflected light back in a direction opposite to the direction of incidence. While both the O'Connell and Tsunefuji patents describe materials which can reflect light at night, they are each designed to appear as a normal non-reflective fabric during the daylight. Furthermore, the appearance of the light reflected would be the same as the color of the light which it receives.

U.S. Pat. No. 4,187,332 to Fouche, Jr. describes a process for producing wash resistant light-reflective fabrics for use in garments and wearing apparel to enhance nighttime visibility without significantly detracting from their daytime visual appearance. The process involves applying to a surface of a textile fabric constructed from differentially dyed or dyeable yarns or fibers a liquid paste composition containing a uniform dispersion of binder-coated, reflex-reflective, magnetically orientable particles suspended therein. A magnetic force field is applied to the fabric during its production so that the particles are oriented in the paste composition with their light reflecting surfaces disposed outwardly. Like the O'Connell and Tsunefuji patents described above, fabrics made according to the Fouche, Jr. patent are designed to appear to be non-reflective in the daylight, and the reflected light has the same appearance as what is received.

U.S. Pat. No. 5,882,770 to Makansi describes fabrics having rainbow and hologram images. A fibrous sheet is provided with an outer surface having fibrous elements which are embossed with a pattern of fine grooves that are substantially aligned from fibrous element to fibrous element. The pattern of fine grooves is embossed directly on the surface of the fibrous sheet and produces rainbow and/or hologram images on exposure to light. The fabric is designed to be free from plastic or metal foils.

Heretofore, none of the prior art methods for providing such reflective or retroreflective fabrics has achieved a combination of good hand and durability while providing desirable levels of light reflection. Further, a need exists for a fabric having desirable reflective characteristics and which can be readily and efficiently molded into three-dimensional shapes.

SUMMARY

The instant invention overcomes the deficiencies of the prior art by providing fabric constructions which have superior durability and which provide a unique and aesthetically pleasing appearance. In addition, the fabrics of the instant invention can be manufactured to provide retroreflection and diffraction capabilities that will render items made from or containing the fabrics extremely conspicuous to observers. The fabrics can thus be utilized to enhance the visibility of certain articles, such as for automobile safety equipment and the like. Furthermore, the fabrics of the instant invention can be readily and efficiently manufactured, and can be used in the construction of a wide variety of end products.

The invention achieves these advantages by way of a composite fabric having a layer of textile fabric which forms the visual surface of the fabric, and a layer of diffractive or retroreflective material positioned and secured beneath the textile fabric layer. For purposes of this patent disclosure, the terms "outer" and "visual" surface of the fabric are intended to describe the side of the fabric which is designed to be the aesthetic or "right" side of the fabric. In other words, when the fabric is used to form an article, this side will be positioned to be the surface readily viewed by a user. For example, it would form the outer surface of an item of apparel, the surface of a door panel which is viewed by an observer, etc.

For purposes of the invention, the term "diffractive" describes materials that cause a diffraction, i.e. a redistribution in space of the intensity of waves that results from the presence of an object causing variations of either the amplitude or phase of the waves. In a preferred form of the invention, this is accomplished using a holographically embossed diffraction film or another form of diffraction grating (i.e. an optical device consisting of an assembly of narrow slits or grooves which produce a large number of beams that can interfere to produce interference spectra or patterns.) The term "retroreflective" describes materials that reflect light under retroreflective lighting conditions (i.e. ambient light that is substantially collimated, such as the light cast by the headlight of an automobile, a flashlight or the like) and reflect the light so that the paths of the rays are parallel to those of the incident rays. As a result, the light rays are reflected directly back toward their source. Retroreflective materials generally utilize transparent microspheres, typically with hemispheric retroreflectors thereon, or prismatic designs incorporating one or more structures commonly known as cube corners. Examples of retroreflective materials which can be used in the instant invention are described in U.S. Pat. No. 5,962,121 to Mori and U.S. Pat. No. 5,962,108 to Nestegard et al., although other types of retroreflective materials may also be used within the scope of the instant invention.

The textile fabric is selected to enable at least a portion of the layer of diffractive or retroreflective material to be seen through the fabric. In one embodiment of the invention, this is achieved through the utilization of a mesh-like layer of textile fabric which has a plurality of openings between the fabric-forming yarns which enable viewing of the diffractive or retroreflective material layer. In another embodiment of the invention, the textile fabric is semi-transparent, such that the layer of diffractive or retroreflective material can reflect light through the layer of textile fabric.

In other aspects of the invention, additional layers of material are included to provide additional structural rigidity to the composite material. For example, an intermediate layer such as a generally clear or transparent film layer or the like can be provided between the layer of textile fabric and the layer of diffractive or retroreflective material, so long as the intermediate layer does not obscure or undesirably impinge on the ability of the diffractive or retroreflective material to receive and reflect light through the textile fabric layer. In addition to or alternatively, an additional layer of material can be provided beneath the layer of diffractive or retroreflective material. For example, a layer of foam, a woven, knit or nonwoven layer of material, or the like can be used within the scope of the invention. The material can be selected to provide the amount of structural rigidity desired for the composite fabric. As will be readily appreciated by those of ordinary skill in the art, a plurality of additional layers can be included within the scope of the invention, in order to contribute to the attainment of the desired features. In addition, the material can be selected to be easily moldable, such that the composite fabric can be used to form three-dimensional molded articles.

The layer of diffractive or retroreflective material can assume a variety of forms according to the instant invention. In one embodiment, the layer of diffractive or retroreflective material is provided as a substantially continuous film layer, which is laminated, adhesively secured, or otherwise attached beneath the rear surface of the textile fabric layer. As noted above, the layer of diffractive or retroreflective material can be secured directly to the rear surface of the layer of textile fabric or it can be secured to a generally transparent intermediate layer which is in turn secured to the rear surface of the textile fabric layer. The layer of diffractive or retroreflective material can also be provided in the form of a plurality of strands (e.g. as filaments or yarns formed partially or entirely from a diffractive or retroreflective material.) Such strands can be manufactured, for example, by slitting a sheet of diffractive or retroreflective material into a plurality of relatively narrow strips. These strands can be secured directly to the rear surface of the layer of textile fabric or sandwiched between the layer of textile fabric and another material such as a layer of foam, a layer of woven, knit or nonwoven material, or the like.

As a further alternative, the diffractive or retroreflective layer can comprise a plurality of particles. The particles can be sandwiched between the textile fabric layer and an additional layer of material, beneath a generally transparent layer which is secured to the textile fabric layer, within a generally transparent layer secured to the rear surface of the textile fabric layer, or the like. In one embodiment of the invention, the textile fabric layer has a plurality of openings and the particles have a dimension which is smaller than that of the openings. In some versions of this embodiment of the invention, only a portion of a diffractive or retroreflective particle appears in an opening in the textile fabric layer while in others, a number of particles can fit in each of the openings in the textile fabric layer. In other embodiments, the particles can be larger than individual openings in the textile fabric layer. The particles can be spread apart or overlapping, depending on the visual appearance and physical properties which are desired to be achieved.

The diffractive or retroreflective material can be colored, designed, patterned, or otherwise ornamented as desired. In addition, the diffractive or retroreflective material can be provided in a pattern with respect to the textile material. For example, the diffractive or retroreflective material could be printed or otherwise secured to a substrate so that it forms a pattern (e.g. a corporate logo, a symbol advising that assistance is needed, etc.) Furthermore, in embodiments of the invention using a holographically-embossed diffraction film to form the diffractive or retroreflective layer, the film can be embossed in any manner (e.g. with geometric shapes, logos, or the like.)

The fabrics made according to the invention thus possess a unique aesthetic appearance. In addition, in the embodiments where a diffractive layer is utilized, a particularly conspicuous fabric can be obtained, due to the color spectrum produced as the light is diffracted and the way the spectrum changes as the observer moves relative to the fabric. As a result, such fabrics have particular utility in the formation of articles designed to alert an observer of the presence of an object (e.g. a trunk liner designed to alert oncoming traffic to the presence of a stalled vehicle and the like.)

BRIEF DESCRIPTION OF THE DRAWINGS

FIG. 1 is an exploded view of a first embodiment of the invention, in which the layer of diffractive or retroreflective material is in the form of a plurality of particles;

FIG. 2 is an exploded view of a second embodiment of the invention in which the layer of diffractive or retroreflective material is in the form of a plurality of strands secured to an additional layer of material;

FIG. 3 is an exploded view of a third embodiment of the invention in which the layer of diffractive or retroreflective material is in the form of a substantially continuous sheet of material; and FIG. 4 is a perspective environmental view of a trunk liner made from the composite fabric of the instant invention.

DETAILED DESCRIPTION

In the following detailed description of the invention, specific preferred embodiments of the invention are described to enable a full and complete understanding of the invention. It will be recognized that it is not intended to limit the invention to the particular preferred embodiments described, and although specific terms are employed in describing the invention, such terms are used in a descriptive sense for the purpose of illustration and not for the purpose of limitation.

With reference to the drawings, FIG. 1 illustrates an exploded view of a composite fabric, shown generally at 10, made according to the instant invention. The composite fabric 10 includes a first layer of textile material 12, and a layer of diffractive or retroreflective material 16 located beneath the layer of textile material. (For purposes of this application, the term "beneath" describes that the layer of diffractive or retroreflective material is positioned on the side of the layer of textile material remote from the visual surface of the fabric. While in many embodiments this will mean that the diffractive or retroreflective layer is directly adjacent the textile material layer, it is also intended to encompass embodiments in which a layer such as a binder film layer is provided between the textile material and diffractive or retroreflective layers, provided such layer enables the diffractive or retroreflective layer to receive and reflect light.)

In the illustrated embodiment of FIG. 1, a layer of generally transparent adhesive 14 is provided between the textile fabric layer 12 and the layer of diffractive or retroreflective material 16. A second layer of generally transparent adhesive 18 is provided beneath the diffractive or retroreflective layer 16 to provide additional support for the particles and substantially encapsulate them, such that they are shielded from many varieties of damaging forces. It is noted, however, that one or both of the generally transparent layers may be eliminated within the scope of the invention, with the use thereof being dependent on such things as the particle size used, the size of the openings in the textile fabric layer, the desired rigidity of the composite, and the like. The generally transparent layers 14, 18 can be of any generally transparent material desired, but will preferably be relatively thin and pliable, in order to provide the composite fabric with good drape and hand capabilities. Furthermore, the generally transparent layer is selected to minimize the interference of the passage of light through the layers to the diffractive or retroreflective layer 16. Adhesive materials such as an adhesive film distributed by Dow Chemical of Midland, Mich. under the product designation DAF-801 and a urethane film distributed by the Deerfield division of Bayer, Inc. (Deerfield, Mass.) under the product designation S-506 have been found to provide composite fabrics with good physical characteristics.

The textile fabric layer 12 is selected so that the diffractive or retroreflective layer 16 positioned beneath it is visible on the opposite surface (i.e. the visual surface) of the textile material. To this end the textile material, in one form of the invention, includes a plurality of openings between the filaments or yarns from which it is manufactured. For example, the textile material can be of a mesh or net construction so that the diffractive or retroreflective layer 16 is readily visible through the openings in the textile material. Alternatively, the textile material can be selected to be semi-transparent, such as by utilizing a gauze-type fabric, a material made from transparent or semi-transparent yarns, or the like. In this way, the diffractive or retroreflective material can be viewed through the textile material, and light which goes through the textile fabric can be reflected back to form a unique visual effect. Furthermore, in embodiments of the invention which utilize a diffractive layer, the light is reflected back in an array of colors, further enhancing the visual appearance thereof.

The textile material can be of any known variety including, but not limited to woven, knit and nonwoven fabrics. Furthermore, because it is located above the diffractive or retroreflective layer, it will generally form the outermost layer in many end use articles. Because of this, it is generally preferred that the fabric have good drape and hand characteristics.

In the embodiment shown in FIG. 1, the diffractive or retroreflective layer 16 is in the form of a plurality of particles 17 of diffractive or retroreflective material. Though illustrated as being spaced apart from each other, it is noted that the spacing of the individual particles can be varied depending on the desired appearance and function of the end product. For example, the particles can be spaced apart from each other a distance greater than their individual dimension, or they can be so close to each other as to be touching or even overlapping. Furthermore, the particles can be evenly spaced from each other or randomly oriented. The particles can be generally circular as illustrated, or can be of any desired shape including, but not limited to, geometrically-shaped or irregularly-shaped. An individual piece of fabric can include particles of a single shape or a plurality of different shapes.

In one embodiment of the invention, the layer of textile fabric includes a series of openings (e.g. openings between intersecting warp and fill yarns in a woven fabric, the openings in a mesh fabric, or the like) and the particles 17 are sized to be substantially smaller than the size of the openings in the fabric. In others, the particles are larger than the size of the openings in the fabric, such that only a portion of an individual particle is beneath a single opening in the textile fabric layer.

FIG. 2 illustrates an alternative embodiment of a composite fabric made according to the invention, shown generally at 20. In this embodiment, a layer of textile fabric 22 is provided, along with a layer of diffractive or retroreflective material 24. In this embodiment of the invention, the layer of diffractive or retroreflective material 24 is provided as a plurality of strands, which in the illustrated embodiment are a plurality of strips of a film of holographically-embossed diffraction film. It is to be noted, however, that the strands can be provided in other forms including, but not limited to diffractive or retroreflective filaments or yarns, yarns formed from diffractive or retroreflective materials in combination with other fibers or yarns, or the like. For example, the strands can comprise a combination of a holographically-embossed diffraction film strip and nylon or polyester, or a combination of yarns coated with a retroreflective coating combined with nylon or polyester, or any other combination which results in providing a diffractive or retroreflective effect.

An additional layer of material 26 is also provided in the FIG. 2 embodiment, in order to provide additional structural stability to the composite. The additional layer of material 26 can be of any variety desired to provide the composite 20 with the desired amount of thickness and structural rigidity. For example, in the illustrated embodiment, the additional layer of material 26 is in the form of an open cell foam sheeting material. For example, low density open cell urethane foam materials have been found to perform well in some embodiments of the invention. However, other types of materials, including but not limited to woven fabrics, knit fabrics, nonwoven fabrics, polymeric materials, rubbers, open and closed cell foams, and the like, can all be used within the scope of the invention. Furthermore, it is noted that more than one additional layer of material can be used as desired. The additional layer(s) of material can also be colored, printed or otherwise ornamented to further enhance the fabric design.

FIG. 3 is a third alternative embodiment of a composite material according to the invention, shown generally at 30. The composite material 30 includes a layer of textile fabric 32 having a visual surface 32a and a rear surface 32b, a layer of diffractive or retroreflective material 34, and a layer of additional material 36 secured to the rear surface of the diffractive or retroreflective layer. In this embodiment of the invention, the textile fabric layer 32 is illustrated as having an open weave construction, whereby the diffractive or retroreflective material 34 can be seen through the interstices in the fabric. The diffractive or retroreflective layer 34 is provided as a generally continuous sheet of diffractive or retroreflective material. For example, the diffractive or retroreflective layer can be provided in the form of a generally continuous holographically-embossed film or a material coated with a coating containing retroreflective elements.

FIG. 4 illustrates the material according to the instant invention incorporated in a trunk liner for an automobile. The trunk liner, shown generally at 40, can be manufactured in any conventional manner. As shown, when the trunk lid of the vehicle is raised, the trunk liner will reflect any light with which it comes in contact in a diffractive or retroreflective manner, to provide an extremely conspicuous visual effect for approaching motorists and the like. Although illustrated as forming a trunk liner for purposes of illustration, it is noted that the composite fabric can be used in any of a wide variety of articles, including but not limited to automotive safety equipment, upholstery fabrics, vehicle door panels, headliners, visors, and the like. In other words, the composite fabric will have utility in any number of applications where a unique visual effect or conspicuous appearance are desired. Furthermore, the composite fabrics can be produced to provide desirable hand and drape, to have enhanced durability, and which can be easily molded to achieve a desired shape or configuration. The resulting fabrics can be molded as an independent structure or as a face surface of an underlying template.

As noted above, the textile fabric layers used in composite fabrics made according to the instant invention can be of any type provided they are sufficiently open or semi-transparent to enable passage of incident and reflected light through the textile fabric layer. For example, they can be an open mesh (such as a knit mesh construction), an open weave or gauze type fabric, a nonwoven fabric, or a fabric made from transparent or semi-transparent yarns or fibers. In some varieties of the invention, it will be desirable to utilize a textile fabric layer which is stretchable in combination with other elements which enable the finished composite fabric to stretch as desired.

Likewise, the diffractive or retroreflective layer can be of any known variety capable of reflecting light in a diffracted or retroreflected manner through the textile fabric layer. For example, holographically-embossed diffraction films such as those sold by Spectratek of Los Angeles, Calif., have been found to perform well in the instant invention. Examples of retroreflective materials useful in composite fabrics of the instant invention are a film distributed by 3M, Inc. of St. Paul, Minn. under the product designation SCOTCHLITE Reflective Material, a reflective ink distributed by 3M, Inc. of St. Paul, Minn. under the product designation 3M Reflective Ink 8011, and a yarn distributed by the Metlon Corp. of Cranston, R.I. under the product designation RETROGLO yarns.

The diffractive or retroreflective layer can be color-tinted as desired to achieve different visual effects. Furthermore, it is to be noted that combinations of diffractive and retroreflective materials can be used within the scope of the invention, as can combinations of particles and generally continuous sheets of material, particles and strands, strands and generally continuous sheets, etc. In addition, the diffractive and retroreflective materials can be provided in any number of glosses, colors, shapes and sizes. As a result, a great deal of design flexibility can be enjoyed to form a number of unique constructions.

The composite fabrics of the instant invention can be manufactured in any desired manner. In some forms of the invention, it will be desirable to provide a layer of generally transparent adhesive between the textile fabric layer and the diffractive or retroreflective layer. For example, urethane adhesive films have been found to perform well in the invention. The layer can be provided as a film, a spray, coating or the like. Alternatively, a thermoplastic material can be used to secure the layers together. It is to be noted, however, that where a continuous-type film is used to join the textile fabric layer to the diffractive or retroreflective layer, care must be taken to select and apply a film which provides good optical clarity, in order that the reflective capabilities of the diffractive or retroreflective layer of material are not adversely impacted to an undesirable extent. As a further alternative, a liquid binder or powder can be applied to the back of the textile fabric layer, and the binder or powder activated to secure the textile fabric layer to the diffractive or retroreflective layer. In this way, a composite material can be produced without the presence of extraneous material (e.g. extra films or the like) over the top of the diffractive or retroreflective material, thereby retaining the full reflective abilities of the diffractive or retroreflective materials. Such powders and binders are well known in the art, and are commonly used in the formation of fabric laminates. For example, a liquid binder distributed by BF Goodrich of Gastonia, N.C. under the product designation Hycar 26319 and a powder adhesive distributed by EMS-American Grilon, Inc. of Sumter, S.C. under the product designation Griltex 9P2-5 have each been found to perform well in the manufacture of composite fabrics according to the instant invention.

In the drawings and specification there has been set forth a preferred embodiment of the invention, and although specific terms are employed, they are used in a generic and descriptive sense only and not for purposes of limitation, the scope of the invention being defined in the claims.

We claim:

1. A composite fabric comprising: a light transmissive textile fabric layer having a visual surface and a rear surface, and
    a diffractive or retroreflective layer secured beneath the rear surface of the textile fabric layer, such that said diffractive or retroreflective layer reflects light passing through said textile fabric layer to provide a unique appearance to the visual surface of the textile fabric layer.

2. A composite fabric according to claim 1, wherein said textile fabric layer is selected from the group consisting of open mesh fabrics, open weave fabrics and semi-transparent fabrics.

3. A composite fabric according to claim 1, wherein said diffractive or retroreflective layer comprises a plurality of particles of a diffractive or retroreflective material.

4. A composite fabric according to claim 2, wherein said diffractive or retroreflective layer comprises a plurality of particles of a diffractive or retroreflective material.

5. A composite fabric according to claim 1, wherein said diffractive or retroreflective layer comprises a plurality of strands of a diffractive or retroreflective material.

6. A composite fabric according to claim 2, wherein said diffractive or retroreflective layer comprises a plurality of strands of a diffractive or retroreflective material.

7. A composite fabric according to claim 1, wherein said diffractive or retroreflective layer comprises a substantially continuous sheet of diffractive or retroreflective material.

8. A composite fabric according to claim 2, wherein said diffractive or retroreflective layer comprises a substantially continuous sheet of diffractive or retroreflective material.

9. A composite fabric according to claim 1, further comprising a layer of substantially transparent material between said textile fabric layer and said layer of diffractive or retroreflective material.

10. A composite fabric according to claim 1, further comprising an additional layer of material secured beneath said diffractive or retroreflective layer to provide additional support to the composite.

11. A composite fabric according to claim 10, wherein said additional layer of material comprises a foam material.

12. A composite fabric according to claim 1, wherein said textile fabric layer is selected from the group consisting of open mesh fabrics, open weave fabrics, and semi-transparent fabrics, and said diffractive or retroreflective layer is selected from the group consisting of particles, strands and substantially continuous sheets of diffractive or retroreflective material.

13. An article of automotive equipment comprising the composite fabric of claim 1.

14. An upholstered article comprising the composite fabric of claim 1.

15. A composite fabric according to claim 1, wherein said diffractive or retroreflective layer comprises a holographically-embossed diffraction film.

16. A composite fabric according to claim 1, wherein said diffractive or retroreflective layer comprises a substrate having a plurality of diffractive or retroreflective elements secured to its surface to form a predetermined pattern.

17. A composite fabric comprising a light transmissive textile fabric layer and a diffractive or retroreflective layer, wherein said diffractive or retroreflective layer and said textile fabric layer are secured together such that light passing through said textile fabric layer is reflected back through said textile fabric layer.

* * * * *